United States Patent
Shin et al.

(10) Patent No.: US 9,136,025 B2
(45) Date of Patent: Sep. 15, 2015

(54) DUAL-COOLED FUEL ROD'S SPACER GRIDS WITH UPPER AND LOWER CROSS-WAVY-SHAPE DIMPLE

(75) Inventors: Chang Hwan Shin, Daejeon (KR); Kang Hee Lee, Daejeon (KR); Dong-Seok Oh, Daejeon (KR); Wang Kee In, Daejeon (KR); Tae Hyun Chun, Daejeon (KR); Kun Woo Song, Daejeon (KR)

(73) Assignees: Korea Atomic Energy Research Institute, Daejeon (KR); Korea Hydro and Nuclear Power Co., Ltd., Seoul (KR)

( * ) Notice: Subject to any disclaimer, the term of this patent is extended or adjusted under 35 U.S.C. 154(b) by 671 days.

(21) Appl. No.: 13/230,439

(22) Filed: Sep. 12, 2011

(65) Prior Publication Data

US 2012/0063562 A1   Mar. 15, 2012

(30) Foreign Application Priority Data

Sep. 15, 2010 (KR) .................. 10-2010-0090732

(51) Int. Cl.
    *G01S 5/04* (2006.01)
    *G21C 3/356* (2006.01)
    *G21C 3/322* (2006.01)
    *G21C 3/352* (2006.01)

(52) U.S. Cl.
    CPC .............. *G21C 3/3563* (2013.01); *G21C 3/322* (2013.01); *G21C 3/352* (2013.01); *Y02E 30/38* (2013.01)

(58) Field of Classification Search
    CPC ....... G21C 3/3563; G21C 3/322; G21C 3/352
    USPC .......................................................... 376/442
    See application file for complete search history.

(56) References Cited

U.S. PATENT DOCUMENTS

| 3,481,832 | A | * | 12/1969 | Rickert | ......................... 376/353 |
| 4,306,937 | A | * | 12/1981 | Hensolt et al. | ................ 376/442 |
| 4,659,541 | A | | 4/1987 | Rylatt | |
| 4,728,489 | A | * | 3/1988 | Hatfield | ......................... 376/439 |
| 5,444,748 | A | | 8/1995 | Beuchel et al. | |
| 6,278,759 | B1 | * | 8/2001 | Yoon et al. | ..................... 376/462 |
| 6,421,407 | B1 | | 7/2002 | Kang et al. | |

(Continued)

FOREIGN PATENT DOCUMENTS

| KR | 2001-0011647 A | 2/2001 |
| KR | 1020010002058 | 5/2001 |

(Continued)

*Primary Examiner* — Frank J McGue
(74) *Attorney, Agent, or Firm* — Maier & Maier, PLLC

(57) ABSTRACT

A dual-cooled fuel rod's spacer grid with upper and lower dimples, including a blocking area of a flow passage that coolant flows through is reduced and dual-cooled fuel rods are supported, and reduces a turbulent flow of the coolant as well as vibrations of the dual-cooled fuel rods, thereby lessening fretting damage done to the rods. The spacer grid includes a plurality of unit grid straps, each of which includes a body disposed in a vertical direction, an upper dimple protruding from an upper portion of the body, and a lower dimple spaced apart from the upper dimple in a downward direction and protruding from a lower portion of the body. The unit grid straps form a grid structure that have inner grid holes into which the dual-cooled fuel rods are held, and the held dual-cooled fuel rods are each supported in four directions by the upper and lower dimples.

2 Claims, 10 Drawing Sheets

(56) References Cited

U.S. PATENT DOCUMENTS

2006/0227925 A1 10/2006 Marzean
2009/0052607 A1* 2/2009 Lee et al. .................. 376/442

FOREIGN PATENT DOCUMENTS

| KR | 10-0330354 | * | 3/2002 |
| KR | 2008-0113869 A | | 12/2008 |

* cited by examiner

DUAL-COOLED FUEL ROD'S SPACER GRIDS WITH UPPER AND LOWER CROSS-WAVY-SHAPE DIMPLE

RELATED APPLICATIONS

This application is the U.S. national stage application which claims priority under 35 U.S.C. §119 to Korean Patent Application No. KR10-2010-0090732, filed on Sep. 15, 2010, the disclosure of which is incorporated by reference herein its entirety.

BACKGROUND OF THE INVENTION

1. Field of the Invention

The present invention relates to spacer grids for dual-cooled fuel rods, and more particularly to spacer grids for dual-cooled fuel rods, the spacer grids having upper and lower cross-wavy-shape dimples, capable of improving support stability of dual-cooled fuel rods.

2. Description of the Related Art

FIG. 1 is a schematic perspective view showing a conventional fuel rod assembly. FIG. 2 is a schematic top-down cross-sectional view showing the conventional fuel rod assembly. FIG. 3 is a schematic top-down view showing a part of a spacer grid applied to the conventional fuel rod assembly. FIG. 4 is a schematic perspective view showing a part of a spacer grid applied to the conventional fuel rod assembly. FIG. 5 is a schematic perspective view showing a unit grid strap of the spacer grid supporting the conventional fuel rod assembly.

As shown in the figures, the fuel rod assembly 10 is made up of fuel rods 11, guide thimbles 14, spacer grids 15, an upper end fitting 12, and a lower end fitting 13.

Here, each fuel rod 11 is configured so that cylindrical uranium sintered pellets are housed in a zirconium alloy cladding tube, and high-temperature heat is generated by a nuclear fission reaction of the uranium sintered pellets.

Meanwhile, each guide thimble 14 is used as the passage of a control rod that moves up and down to adjust output of a reactor core and to halt the nuclear fission reaction. Each spacer grid 15 is one of the components of the nuclear fuel assembly, and has a plurality of unit grid straps, each of which includes a spring 17 and dimples 18. The spring 17 and dimples 18 function to support the fuel rod 11 so as to be arranged at a designated position.

The upper end fitting 12 and the lower end fitting 13 function to fix and support the nuclear fuel assembly 10 to upper and lower structures of the reactor core. The lower end fitting 13 includes a filter (not shown) for filtering foreign materials floating in the inside of the reactor core.

The spacer grid 15 is typically formed of a zirconium alloy, and includes fuel rod cells in which the fuel rods 11 are supported and guide thimble cells into which the guide thimbles 14 are inserted. Each fuel rod 11 is typically supported in the fuel rod cell at a total of six support points by a total of two grid springs 17 located at two grid straps one by one and by a total of four dimples 18 that are located at the other two grid straps and above and below each grid spring two apiece.

Further, cylindrical uranium dioxide ($UO_2$) pellets are charged into the fuel rod 11. A coolant rapidly flows from the bottom to the top of the reactor core through sub-channels 16, each of which is surrounded by four fuel rods 11 or by three fuel rods 11 and one guide thimble 14, in an axial direction. Here, the sub-channel 16 refers to a space surrounded by the fuel rods 11, and a passage that allows fluid to freely flow to neighboring sub-channels through an open gap between the fuel rods.

Meanwhile, when a spring force or a spring constant of the grid spring 17 located in a restricted space is too small, it is impossible to support the fuel rod 11 at a designated position, so that support soundness of the fuel rod 11 may be lost.

In contrast, when the spring force of the grid spring 17 is too great, defects such as a scratch may occur on a surface of the fuel rod 11 due to excessive frictional resistance when the fuel rod 11 is inserted into the fuel rod cell of the spacer grid 15, and it is impossible to properly cover lengthwise growth and thermal expansion of the fuel rod 11 caused by neutron irradiation when the reactor is being operated, so that the fuel rod 11 can become bowed.

When the fuel rod 11 is bowed, it comes near to or in contact with the neighboring fuel rod, thereby narrowing or blocking the coolant channel, i.e. the sub-channel 16, between the fuel rods. As a result, heat generated from the fuel rods is not effectively transmitted to the coolant, thereby causing the phenomenon of the temperature of the fuel rod being locally increased. Accordingly, there is a high possibility of generating a departure from nucleate boiling (DNB) that is a major cause of reduced output of nuclear fuel.

Further, the reactor coolant flowing around the fuel rods 11 is typically known to cause a flow with large turbulence, i.e. a flow of a high Reynolds number, in order to promote thermal performance. The turbulent flow of the coolant around the fuel rods becomes a major cause of flow-induced vibration of the fuel rods.

This flow-induced vibration of the fuel rods is responsible for a relative motion of the fuel rod 11 sliding on contact surfaces of spring structures of the spacer grid 15. For this reason, the fuel rod and the contact surface of the spring structure undergo local attrition. Thus, the fuel rod is gradually damaged, i.e. fretting damage is caused to the fuel rod.

In detail, a cladding tube of the fuel rod is formed of a thin zirconium alloy, and is charged with uranium dioxide pellets as fission materials and an inert gas under pressure. The cladding tube of the fuel rod is supported at multiple points by the contact force of the springs and dimples of the spacer grid.

The flow-induced vibration of the nuclear fuel caused by the high-speed flow of the coolant in the reactor core during its operation occurs over the life span of the nuclear fuel, so that the fretting damage caused by the relative motion occurs at the support points of the fuel rod.

When the fretting damage develops to the point that the cladding tube is penetrated, this leads to an accident wherein the fission products inside the fuel rod contaminate the primary cooling system of the nuclear power plant, and thus the operation of the nuclear power plant may be stopped, or an enormous repair expense may be required.

Meanwhile, as shown in FIGS. 6 and 7, a dual-cooled fuel rod 19 having an annular structure in place of the cylindrical fuel rod 11 is disclosed in U.S. Pat. No. 3,928,19b2, and U.S. Pat. No. 6,909,765.

Here, the dual-cooled fuel rod 19 having an annular structure is made up of sintered compacts or pellets 20 formed in an annular shape, an inner cladding tube 19a installed on inner circumferences of the pellets 20, and an outer cladding tube 19b installed on outer circumferences of the pellets 20. The coolant is allowed to flow to the inside and outside of the dual-cooled fuel rod 19 so as to perform heat transfer doubly, so that it is possible to maintain the inner surface of the dual-cooled fuel rod 19 at a low temperature and to obtain high burnup and output.

When the central temperature of the dual-cooled fuel rod 19 is kept low in this way, there is a reduced possibility of fuel damage caused by an increase in central temperature of the nuclear fuel, so that it is possible to increase the safety margin of the dual-cooled fuel rod 19.

However, to be structurally compatible with the core of an existing pressurized water reactor (PWR), it is impossible to change positions of the guide thimbles 14 in the nuclear fuel assembly 10'. Since an outer diameter of the dual-cooled fuel rod 19 is increased, a gap between the dual-cooled fuel rods 19 is considerably reduced, compared to a gap between the existing cylindrical fuel rods.

For example, when the nuclear fuel assembly is manufactured according to a candidate design draft for the dual-cooled fuel rods having a 12×12 array, the gap between the dual-cooled fuel rods is reduced from the existing 3.35 mm to 1.24 mm.

Thus, due to the narrow gap between the dual-cooled fuel rods, the spacer grid developed up to now cannot be used as a support structure for the dual-cooled fuel rods 19 unless it is changed.

That is, a thickness, 0.475 mm, of the unit grid strap of the existing spacer grid is subtracted from an interval, 1.24 mm, between the dual-cooled fuel rods, and the resulting value is divided by two, so that an interval between the unit grid strap and the dual-cooled fuel rod is about 0.383 mm. As such, it is impossible to design the spring having spring rigidity and hydraulic characteristics (mainly, pressure loss), both of which the existing support structure has, by applying a shape and a support position as in an existing leaf spring within this narrow interval.

SUMMARY OF THE INVENTION

Accordingly, the present invention has been made keeping in mind the above problems occurring in the related art, and embodiments of the present invention provide spacer grids for dual-cooled fuel rods, the spacer grids having upper and lower cross-wavy-shape dimples, capable of improving the support stability of dual-cooled fuel rods.

To achieve the aforementioned objective, spacer grids for dual-cooled fuel rods, the spacer grids having upper and lower cross-wavy-shape dimples, according to exemplary embodiments of the present invention are characterized by being configured so that a blocking area of a flow passage through which a coolant flows is reduced and dual-cooled fuel rods are supported, and by reducing a turbulent flow of the coolant as well as vibrations of the dual-cooled fuel rods, thereby reducing fretting damage to the dual-cooled fuel rods.

In detail, the dual-cooled fuel rod's spacer grid includes a plurality of unit grid straps, each of which includes a body disposed in a vertical direction, an upper dimple protruding from an upper portion of the body, and a lower dimple spaced apart from the upper dimple in a downward direction and protruding from a lower portion of the body. The plurality of unit grid straps form a grid structure so as to have inner grid holes holding the dual-cooled fuel rods, and the held dual-cooled fuel rods are each supported in four directions by the upper and lower dimples.

Here, the upper and lower dimples may be each formed so as to be curved.

Further, the upper and lower dimples may be each formed in a sinusoidal shape in which the upper and lower dimples each protrude from the body toward opposite sides of the body.

Furthermore, the upper and lower dimples may be each formed in a sinusoidal shape in which the upper and lower dimples each protrude from the body towards opposite sides of the body, and have a phase difference of n radians relative to each other on the same plane.

According to the present invention, the dual-cooled fuel rod's spacer grid effectively supports the dual-cooled fuel rods arranged at very narrow intervals in a firm structure, reduces pressure loss or transverse translation in a simple cross-sectional shape, and reduces vibration of the dual-cooled fuel rods that occurs over the lifespan of the dual-cooled fuel rods and the resulting fretting damage done to the cladding tubes of the dual-cooled fuel rods.

Accordingly, the spacer grid makes it possible to provide a mechanical configuration for the spacer grid of the dual-cooled fuel rods, and it can simultaneously and greatly improve the support stability of the dual-cooled fuel rods.

BRIEF DESCRIPTION OF THE DRAWINGS

The above and other objectives, features and advantages of the present invention will be more clearly understood from the following detailed description when taken in conjunction with the accompanying drawings, in which.

DESCRIPTION OF THE PREFERRED EMBODIMENTS

Reference will now be made in greater detail to exemplary embodiments of the invention with reference to the accompanying drawings.

The present invention is characterized by being configured so that a blocking area of a flow passage through which a coolant flows is reduced and dual-cooled fuel rods are supported, and by reducing a turbulent flow of the coolant as well as vibrations of the dual-cooled fuel rods, thereby reducing fretting damage done to the dual-cooled fuel rods.

Figure 1:
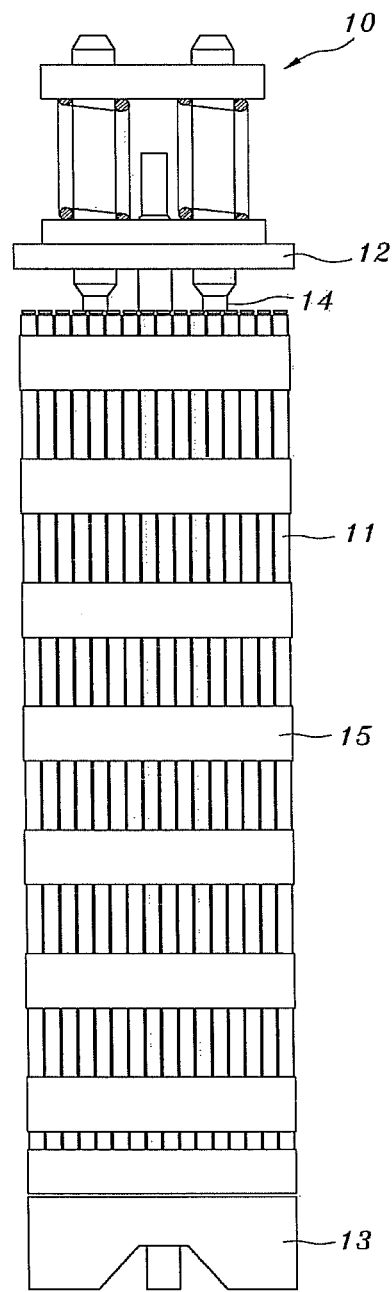
FIG. 1 is a perspective view illustrating a conventional nuclear fuel assembly.
Figure 2:
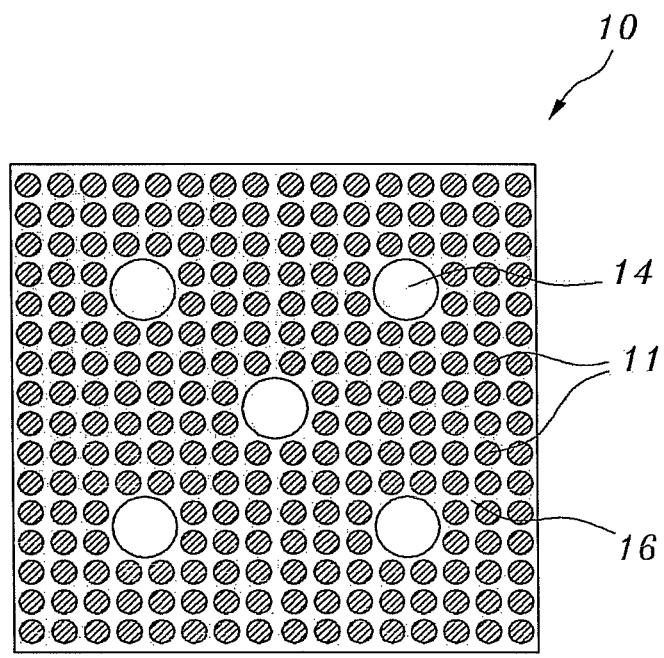
FIG. 2 is a schematic top-down cross-sectional view illustrating a cross section of the conventional nuclear fuel assembly.
Figure 3:
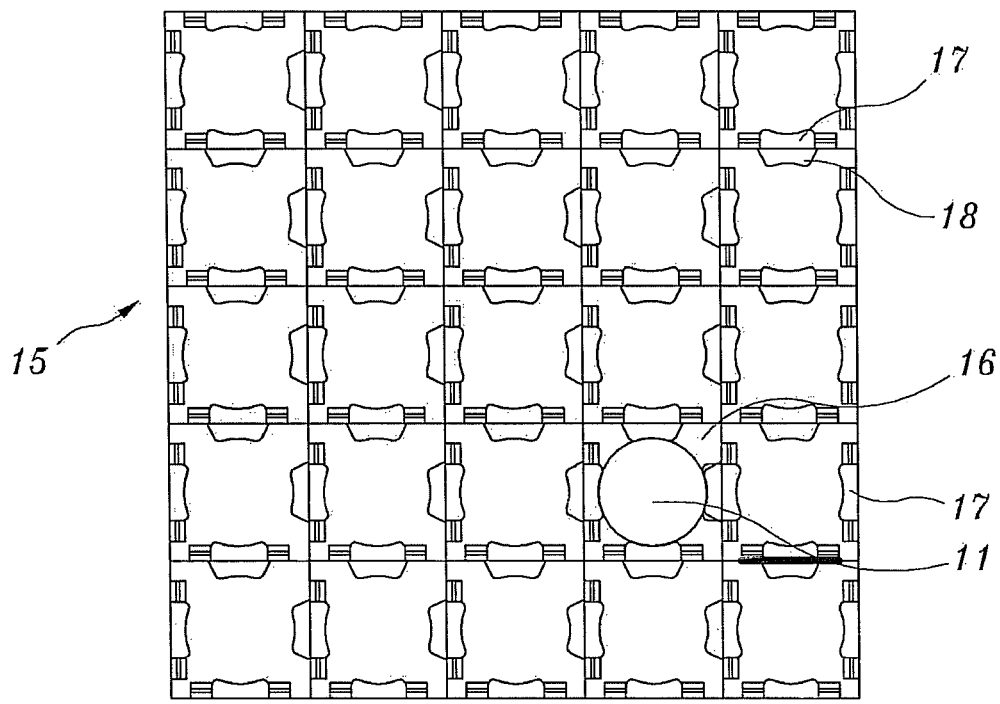
FIG. 3 is a schematic top-down view illustrating a part of a spacer grid applied to the conventional nuclear fuel assembly.
Figure 4:
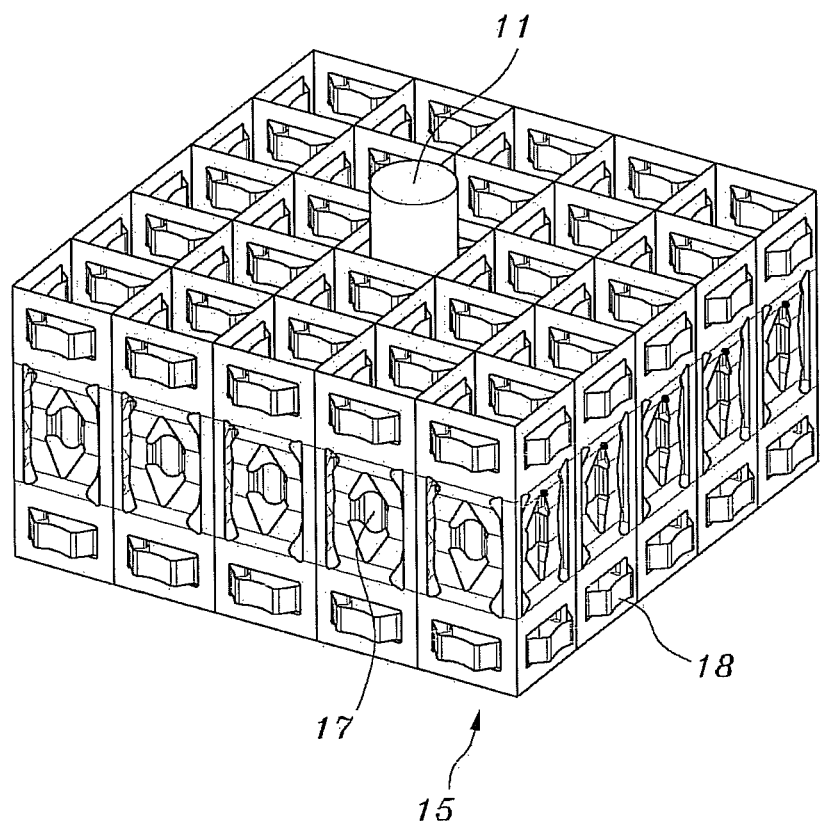
FIG. 4 is a schematic perspective view illustrating the part of the spacer grid applied to the conventional nuclear fuel assembly.
Figure 5:
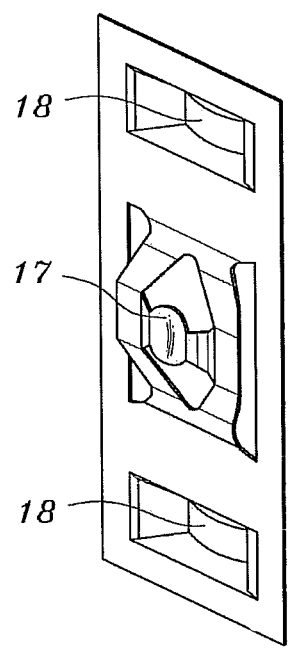
FIG. 5 is a schematic perspective view illustrating a unit grid strap of the spacer grid supporting a conventional fuel rod.
Figure 6:
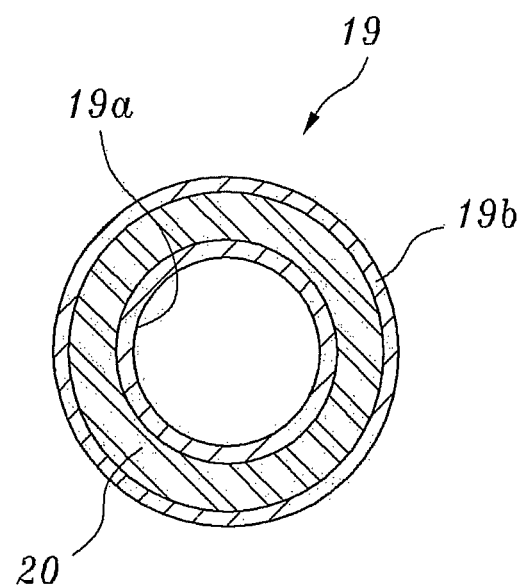
FIG. 6 schematically illustrates a transverse cross section of a dual-cooled fuel rod applied to the present invention.
Figure 7:
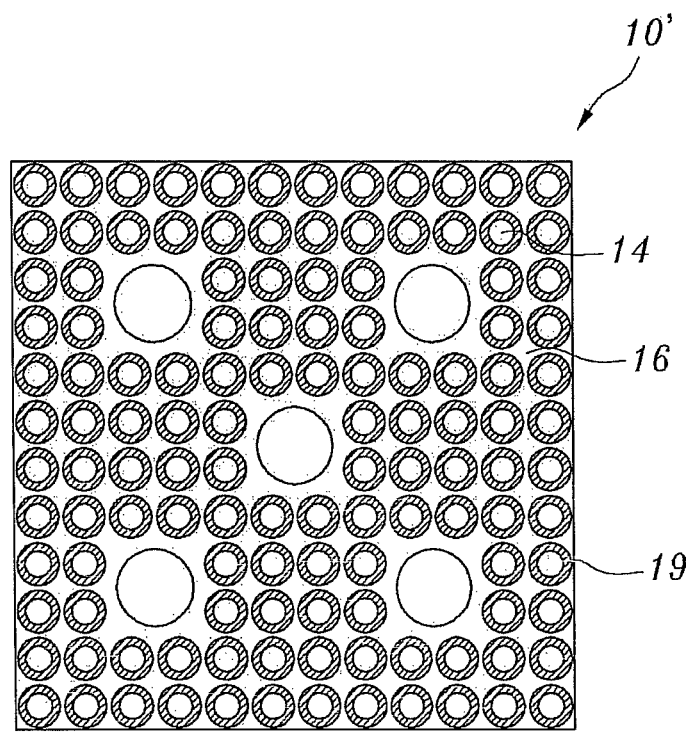
FIG. 7 is schematic top-down view illustrating a cross section of the dual-cooled fuel rod applied to the present invention.
Figure 8:
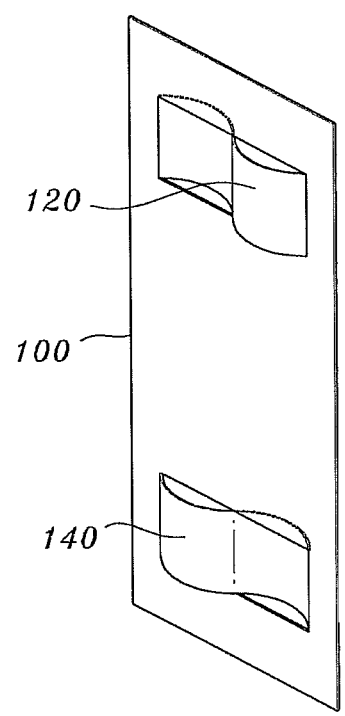
FIG. 8 is a perspective view illustrating a unit grid strap of a dual-cooled fuel rod's spacer grid with upper and lower cross-wavy-shape dimples according to an exemplary embodiment of the present invention.
Figure 9:
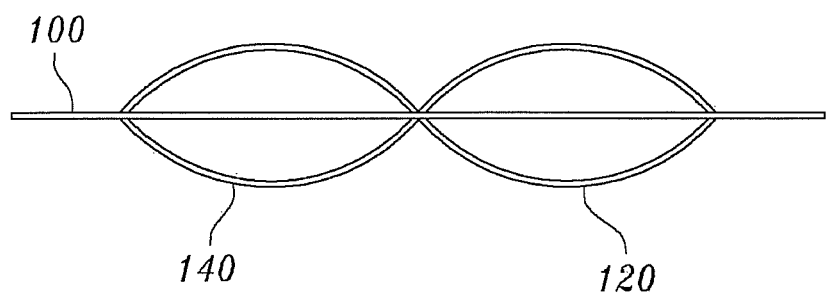
FIG. 9 is a top-down view illustrating the unit grid strap of FIG. 8.
Figure 10:
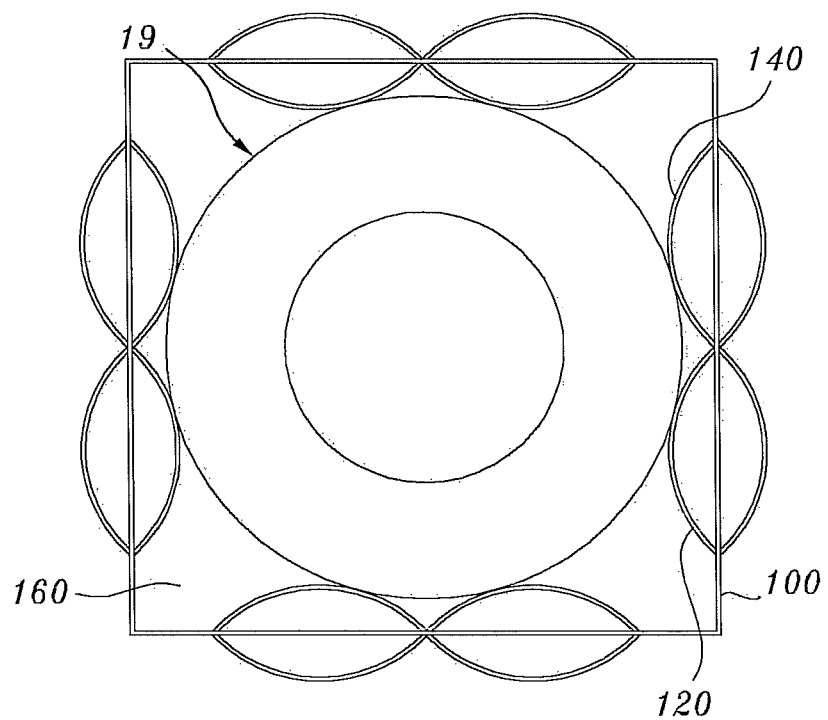
FIG. 10 is a top-down view illustrating how the unit grid straps of FIG. 8 form a grid structure to support a dual-cooled fuel rod.

FIG. 8 is a perspective view illustrating a unit grid strap of a dual-cooled fuel rod's spacer grid with upper and lower cross-wavy-shape dimples according to an exemplary embodiment of the present invention. FIG. 9 is a top-down view illustrating the unit grid strap of FIG. 8. FIG. 10 is a top-down view illustrating how the unit grid straps of FIG. 8 form a grid structure to support a dual-cooled fuel rod.

Referring to the figures, the dual-cooled fuel rod's spacer grid with upper and lower cross-wavy-shape dimples according to an exemplary embodiment of the present invention is configured so that a plurality of unit grid straps are formed in a grid structure.

The unit grid strap includes a body 100 and upper and lower dimples 120 and 140 formed on the body 100.

The body 100 is disposed in an upright structure in the spacer grid so that a dual-cooled fuel rod 19 is supported and fixed in an upright posture.

Here, the upper dimple 120 protrudes from an upper portion of the body 100, and the lower dimple 140 is spaced apart from the upper dimple in a downward direction and protrudes from a lower portion of the body 100.

The plurality of unit grid straps, each of which has these upper and lower dimples 120 and 140, are formed in a grid structure. Thus, a grid hole 160 is formed inside the grid structure, and the dual-cooled fuel rod 19 is inserted into and held in the grid hole 160.

The held dual-cooled fuel rod 19 is supported in four directions by the upper and lower dimples 120 and 140 so as to be able to be positioned. That is, the unit grid strap is configured so that the upper and lower dimples 120 and 140 can support an outer circumference of the adjacent dual-cooled fuel rod 19 while being spaced apart from each other in a vertical direction.

Thus, the spacer grid may be configured so that a plurality of unit grids forms a grid structure, and furthermore a transverse section where the unit grids are arranged in a row and a longitudinal section having the same structure as the transverse section are fastened to form the grid structure.

In detail, the upper and lower dimples 120 and 140 are preferably formed so as to be curved.

That is, the upper and lower dimples 120 and 140 preferably support the dual-cooled fuel rod 19 in a point contact state so that the contact area of the dual-cooled fuel rod 19 is at a minimum when the dual-cooled fuel rod 19 is vibrated. Thus, the upper and lower dimples 120 and 140 properly have a curved shape to support the outer circumference of the dual-cooled fuel rod 19 without it being damaged.

When the dual-cooled fuel rod 19 is vibrated, the upper and lower dimples 120 and 140 are momentarily compressed. Even when the compression is released, the upper and lower dimples 120 and 140 are allowed to stably support the dual-cooled fuel rod 19 due to a resilient force caused by their curved shape.

In addition, each of the upper and lower dimples 120 and 140 has a sinusoidal shape so that it protrudes from the body 100 towards opposite sides of the body 100.

Thus, the unit grid strap supports the dual-cooled fuel rod 19 located on one side thereof in such a manner that protrusions of the upper and lower dimples 120 and 140 which protrude to one side of the body 100 support the dual-cooled fuel rod 19, and simultaneously the other dual-cooled fuel rod 19 located on the other side thereof in such a manner that protrusions of the upper and lower dimples 120 and 140 which protrude to the other side of the body 100 support the other dual-cooled fuel rod 19.

More preferably, each of the upper and lower dimples 120 and 140 has a sinusoidal shape so that it protrudes from the body 100 towards opposite sides of the body 100, and one of the upper and lower dimples 120 and 140 has a phase difference of $\pi$ radians relative to the other on the same plane.

In this manner, the upper and lower dimples 120 and 140 formed in the sinusoidal shape have the phase difference of it radians, i.e. 180°, relative to each other when viewed on the same plane, so that they compress and support the outer circumference of the dual-cooled fuel rod 19 apart from each other by a predetermined distance on the same plane.

In detail, the unit grid strap supports the dual-cooled fuel rod 19 in four directions, and compresses and supports points spaced apart from each other by the same interval on the opposite sides of the vertical central line extending from the center of the dual-cooled fuel rod 19 to the body 100, thereby forming a balanced stable support structure.

The present invention configured as described above effectively supports the dual-cooled fuel rods 19 arranged at very narrow intervals in a firm structure, reduces the pressure loss or the transverse translation in a simple cross-sectional shape, and reduces the vibrations of the dual-cooled fuel rods 19 that occur over the lifespan of the dual-cooled fuel rods and the fretting damage to the cladding tubes of the dual-cooled fuel rods that it results in.

Accordingly, the spacer grid makes it possible to provide a mechanical configuration for the spacer grid of the dual-cooled fuel rods 19, and simultaneously it can greatly improve the support stability of the dual-cooled fuel rods 19.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A dual-cooled fuel rod's spacer grid comprising:
a spacer grid for a dual-cooled fuel rod with upper and lower cross-wavy-shape dimples, the spacer grid configured so that a blocking area of a flow passage through which a coolant flows is reduced and dual-cooled fuel rods are supported, and which reduces a turbulent flow of the coolant as well as vibrations of the dual-cooled fuel rods to thereby lessen fretting damage to the dual-cooled fuel rods, and in which the dimples are in contact with a neighboring fuel rod in a cross-wavy-shape to maintain a narrow interval between the fuel rods as wide as possible,
the dual-cooled fuel rod's spacer grid further comprising:
a plurality of unit grid straps, each of which includes a body disposed in a vertical direction, the upper dimple protruding from an upper portion of the body, and the lower dimple spaced apart from the upper dimple in a downward direction and protruding from a lower portion of the body,
wherein the plurality of unit grid straps forms a grid structure so as to have a plurality of inner grid holes that holds the dual-cooled fuel rods, and the held dual-cooled fuel rods are each supported in four directions by the upper and lower dimples,.
wherein the upper and lower dimples are each separately formed in in parallel sinusoidal shapes continuously formed in single waves so that the upper and lower dimples each protrude from the body towards opposite sides of the body, and have a phase difference of $\pi$ radians relative to each other on the same plane.

2. The dual-cooled fuel rod's spacer grid set forth in claim 1, wherein the upper and lower dimples are each formed so as to be curved.

* * * * *